United States Patent
Gopalakrishna

(10) Patent No.: US 9,741,185 B2
(45) Date of Patent: Aug. 22, 2017

(54) ANTI-PASS BACK CAPACITY PREDICTIVE SYSTEM AND METHOD FOR ACCESS CONTROL HOST PROCESSING SYSTEM

(71) Applicant: Honeywell International Inc., Morristown, NJ (US)

(72) Inventor: Rajesh Gopalakrishna, Sterling, VA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/019,145

(22) Filed: Feb. 9, 2016

(65) Prior Publication Data

US 2017/0178430 A1    Jun. 22, 2017

Related U.S. Application Data

(60) Provisional application No. 62/269,370, filed on Dec. 18, 2015.

(51) Int. Cl.
| | |
|---|---|
| *H04L 29/06* | (2006.01) |
| *H04L 12/58* | (2006.01) |
| *G07C 9/00* | (2006.01) |

(52) U.S. Cl.
CPC ...... *G07C 9/00007* (2013.01); *H04L 12/5875* (2013.01); *H04L 51/18* (2013.01);
(Continued)

(58) Field of Classification Search
CPC .... A61B 5/0468; A61B 5/746; G06Q 10/107; G07C 9/00007; G07C 9/00103;
(Continued)

(56) References Cited

U.S. PATENT DOCUMENTS

| | | | |
|---|---|---|---|
| 2015/0188874 A1* | 7/2015 | Feinstein | H04L 51/34 709/206 |
| 2017/0048246 A1* | 2/2017 | Gopalakrishna | G07C 9/00007 |
| 2017/0079059 A1* | 3/2017 | Li | H04W 72/042 |

FOREIGN PATENT DOCUMENTS

| | | |
|---|---|---|
| EP | 2584538 A1 | 4/2013 |
| GB | 2278220 A | 11/1994 |

OTHER PUBLICATIONS

Paxton, Configuring anti-passback Anti-passback principles, URL:http://www.paxton-access.co.uk/docs/Application notes/AN1063.pdf, dated Sep. 4, 2014.

(Continued)

*Primary Examiner* — Dionne H Pendleton
(74) *Attorney, Agent, or Firm* — Husch Blackwell LLP

(57) ABSTRACT

An anti-pass back capacity predictive system and method for an access control host processing system are provided. Some methods can include a host system identifying a number of APB status messages generated by the host system in connection with the host system monitoring a facility, the host system comparing the number of APB status messages generated by the host system with a baseline threshold value, when the number of APB status messages generated by the host system is less than or equal to the baseline threshold value, the host system determining that enabling an APB feature in the facility will be successful, and when the number of APB status messages generated by the host system is greater than the baseline threshold value, the host system determining that enabling the APB feature in the facility will fail.

20 Claims, 2 Drawing Sheets

(52) U.S. Cl.
CPC .............. *H04L 51/30* (2013.01); *H04L 51/34* (2013.01); *H04L 63/1408* (2013.01)

(58) Field of Classification Search
CPC ......... G07C 9/025; H04L 51/12; H04L 51/14; H04L 51/18; H04L 63/1408; H04L 63/0281; H04L 63/10; H04W 72/042; H04W 72/1273
See application file for complete search history.

(56) References Cited

OTHER PUBLICATIONS

Paxton, Configuring areas and area groups, URL:http://www.paxton-access.co.uk/docs/Application notes/AN1023.pdf, dated Nov. 1, 2013.
Extended European search report for corresponding EP patent application 16201587.9, dated Mar. 9, 2017.

* cited by examiner

ANTI-PASS BACK CAPACITY PREDICTIVE SYSTEM AND METHOD FOR ACCESS CONTROL HOST PROCESSING SYSTEM

CROSS-REFERENCE TO RELATED APPLICATIONS

This application claims priority to U.S. Provisional Patent Application No. 62/269,370 filed Dec. 18, 2015 and titled "Anti-Pass Back Capacity Predictive System and Method for Access Control Host Processing System." U.S. Application No. 62/269,370 is hereby incorporated by reference.

FIELD

The present invention relates generally to an access control host processing system. More particularly, the present invention relates to an anti-pass back capacity predictive system and method for an access control host processing system.

BACKGROUND

Many known access control systems include an anti-pass back (APB) feature that prevents unauthorized users from tailgating an authorized user to gain access to a secured region. For example, when a user presents a valid access card to a card reader to gain access to a secured region, an APB feature prevents an unauthorized second user from using the same card to gain access to the region. Such an APB feature can include dividing a secured region or facility into AREAs, designating different card readers as an IN reader or an OUT reader, and controlling access to the secured region in accordance with three rules: (1) a user presenting a valid card to an IN reader must present the same card to an OUT reader before again presenting the card to an IN reader, (2) after presenting a valid card to an IN reader, a user presenting the same card to the same or another IN reader without presenting the card to an OUT reader will be disallowed access, and (3) after presenting a valid card to an OUT reader, a user presenting the same card to the same or another OUT reader without presenting the card to an IN reader will be disallowed access.

Known access control systems can include a host processing system, one or more SITEs, and one or more AREAs. For example, a host processing system can include any system that is capable of communicating with an access controller and sending an APB status message to the access controller. A SITE can include a logical group or cluster of access controllers based on proximity, region, or location, and an AREA can include a group of IN readers and OUT readers that are associated with one or more access controllers and that adhere to the above-identified rules. For example, an AREA can include access controllers from a single SITE and typically does not include access controllers from multiple SITEs.

An APB feature can operate in a facility that includes a plurality of card readers communicating with a plurality of different access controllers. However, several different forms of APB features are known. For example, when a GLOBAL APB feature is employed, a card swipe that occurs on one card reader communicating with one access controller can lead to an APB status message being broadcast to all other controllers in the facility that are participating in the APB feature. When a SITE based APB feature is employed, an APB status message is limited to being broadcast to controllers in a particular SITE and to controllers located in referencing AREAs. When an AREA based APB feature is employed, an APB status message is limited to being broadcast to controllers located in referencing AREAs.

When designing and planning an access control system that includes an APB feature, it is both useful and necessary for an integrator, facility manager, security manager, IT department, and the like to plan for the capacity of the APB feature. For example, it is necessary for such stakeholders to determine whether a host system can support APB performance and whether an APB threshold value will be exceeded. Such planning is useful in at least three situations: (1) when an APB feature is enabled for the first time on an access controller in an existing host system, (2) when an existing APB enabled host system is updated, for example, by adding a new set of APB enabled access controllers to the host system or by adding a new set of AREAs to the host system, and (3) prior to deploying a new host system. For example, an estimated number of APB enabled access controllers that can be supported by the new host system should be identified prior to deploying the system.

When capacity planning is lacking, undesirable results can manifest in operational, performance, and return-on-investment (ROI) issues. For example, when an excessive number of APB enabled access controllers are supported by a single host processing system, the host system may generate a large number of APB status messages responsive to signals from the controllers, but the host system may be unable to process and transmit each status message in a timely manner. Accordingly, card holders may not be able to get in and out of a secured region in a timely manner or to an evacuation region in an emergency situation. Furthermore, when the processing power and time of the host system is consumed with a large number of APB status messages, performance issues may arise in other functional areas of the host system, such as processing events from controllers, acknowledging alarms and operator action, and the like. Finally, when a facility includes multiple host systems and the performance of any individual host system is not optimized, such as a host system processing a number of APB status messages that is less than a threshold number, the overall total number of host systems can be reduced by consolidating host systems, thereby improving on a ROI in terms of the hardware, software, monitoring personnel, IT personnel, and the like required for each host system.

However, when capacity planning is performed properly, stakeholders can make appropriate corrective decisions, such as whether to add additional host systems, consolidate access controllers for multiple host systems, or change the configuration for an AREA in the system, such as, for example, an APB type (GLOBAL, SITE based, or AREA based), in order to optimize the operation, performance, and ROI of the system. Accordingly, there is a continuing, ongoing need for systems and methods of predicting APB capacity.

DETAILED DESCRIPTION

Figure 1:
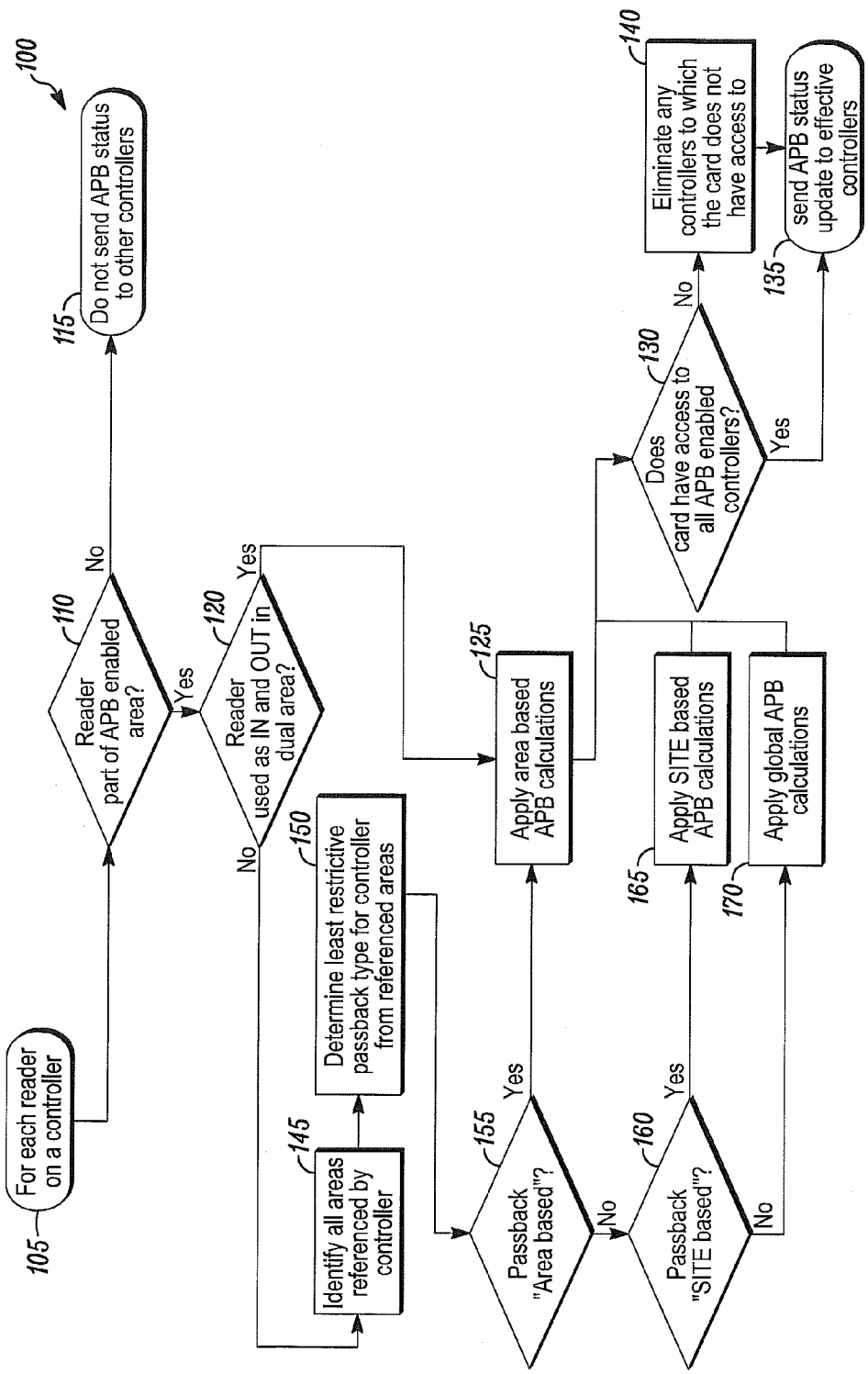
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include an anti-pass back capacity predictive system and method for an access control host processing system. For example, in some systems and methods disclosed herein, a total number of APB status messages generated can be identified and compared to a baseline threshold to determine a host system's APB capability.

In accordance with disclosed embodiments, the following input parameters can be identified or computed for an existing host system: (1) the number of APB enabled controllers supported by the host system, (2) the number of APB enabled readers supported by the controllers supported by the host system (that is, the readers that are part of the supported AREAs and that are designated as IN or OUT), (3) the form of APB feature used (GLOBAL, SITE based, or AREA based) for each reader and controller, (4) the total number of valid card transactions occurring at an APB enabled reader, and (5) the type of access (all access or limited access) a card has to the APB enabled controllers. When an APB feature is enabled for the first time on an access controller in an existing host system or when an existing APB enabled host system is updated, some or all of the above-identified input parameters can be identified or computed. However, for a new host system that is yet to be deployed, where input parameters are unavailable, values of the unavailable input parameters can be assigned based on an assessment of the existing or future landscape of a facility that the host system will support.

In some embodiments, the following steps can be executed to determine whether enabling an APB feature in a facility will be successful or not. First, the number of APB enabled access controllers in the facility can be identified, and the AREAs with IN and OUT readers for each controller can be set up or identified. Second, for each controller and reader, a determination can be made as to the type of reader in a respective AREA (IN only, OUT only, or IN and OUT), the type of APB feature (GLOBAL, SITE based, or AREA based) supported by the controller, and whether a host system should send an APB status message to the controllers in the system. Then, the number of APB status messages generated by the host system can be determined and that number can be compared to a predetermined baseline number of APB status messages to determine whether enabling the APB feature in the facility will be successful.

For example, to determine whether a host system should send an APB status message to each controller, the method 100 of FIG. 1 can be executed. As seen in FIG. 1, the method 100 can include, for each reader supported by an access controller as in 105, determining whether the reader supported by the controller is part of an APB enabled AREA as in 110. If not, then the method 100 need not send an APB status to other controllers as in 115.

However, if the method 100 determines that the reader supported by the controller is part of an APB enabled AREA as in 110, then the method 100 can include determining whether the reader is used as an IN reader and an OUT reader in dual AREAs as in 120. If yes, then the method 100 can include applying AREA based APB calculations as in 125 and determining whether a card presented to the reader has access to all APB enabled controllers as in 130. If yes, then the method 100 can include sending an APB status update to effective controllers as in 135. However, if the method 100 determines that the card presented to the reader does not have access to all APB enabled controllers as in 130, then the method 100 can include eliminating any controllers to which the card does not have access and sending an APB status update to effective controllers as in 140.

If the method 100 determines that the reader is not used as an IN reader and an OUT reader in dual AREAs as in 120, then the method 100 can including identifying all AREAs referenced by the controller as in 145 and determining the least restrictive pass-back type for the controller from the referenced AREAs as in 150. Then, the method 100 can include determining whether the least restrictive pass-back type is AREA based as in 155. If yes, then the method 100 can include applying AREA based APB calculations as in 125 and determining whether a card presented to the reader has access to all APB enabled controllers as in 130. If the method 100 determines that the least restrictive pass-back type is not AREA based as in 155, then the method 100 can include determining whether the least restrictive pass-back type is SITE based as in 160. If yes, then the method 100 can include applying SITE based APB calculations as in 165 and determining whether a card presented to the card reader has access to all APB enabled controllers as in 130. However, if the method 100 determines that the least restrictive pass-back type is not SITE based as in 160, then the method 100 can include applying GLOBAL APB calculations as in 170 and determining whether a card presented to the card reader has access to all APB enabled controllers as in 130.

As explained above, after execution of the method 100, the number of APB status messages generated by the host system can be determined. In some embodiments, the number of APB status messages generated can be determined as identified in Equation (1).

> Total number of APB status messages generated in host system=Total number of APB status messages generated due to GLOBAL APB enabled controllers+Total number of APB status messages generated due to SITE based APB enabled controllers+Total number of APB status messages generated due to AREA based APB enabled controllers    Equation 1:

For a card with access to all APB enabled controllers, Equation (2) is applicable.

> Total number of APB status messages generated in host system=[Total number of valid card transactions occurring on GLOBAL APB enabled controllers*(Total number of APB enabled controllers−1)]+Σ[Total number of valid card transactions occurring on a reader on a controller in (Site($i$)) using SITE based APB feature*(Total number of corresponding unique APB enabled controllers between (Site($i$)) and (reader referenced Area($j$))−1)]+Σ[Total number of valid card transactions occurring on a reader on a controller using AREA based APB feature*(Total number of APB enabled controllers in corresponding reader referenced (Area($k$))−1)]    Equation 2:

However, for a card with limited access to all APB enabled controllers, Equation (3) is applicable.

> Total number of APB status messages generated in host system=[Total number of valid card transactions occurring on GLOBAL APB enabled controllers*(Total number of APB enabled controllers to which the card has access−1)]+Σ[Total number of valid card transactions occurring on a reader on a controller in (Site($i$)) using SITE based APB feature*(Total number of corresponding unique APB enabled controllers between (Site($i$)) and (reader referenced Area($j$)) to which card has access−1)]+Σ[Total number of valid card transactions occurring on a reader on a controller using AREA based APB feature*(Total number of APB enabled controllers in corresponding reader referenced (Area(k)) to which the card has access−1)]  Equation 3:

In some embodiments, the number of APB status messages generated by the host system can be determined as identified above for a predetermined time range, such as hourly or daily, and for all valid card events at a reader in the system. Then, as explained above, the number of APB status messages generated by the host system, $T_{actual}$, can be compared to a predetermined baseline number of APB status messages, $T_{baseline}$, to determine whether enabling the APB feature in the facility will be successful. For example, in some embodiments, the number of APB status messages generated by the host system for all readers supported by all controllers supported by the host system and within the predetermined time range can be combined and identified as the total number of APB status messages generated, $T_{actual}$.

In some embodiments, the value of $T_{baseline}$ can be a predetermined value. For example, the value of $T_{baseline}$ can include a published standard performance baseline test result that is indicative of the threshold number of APB status messages processed for an existing version of the host system beyond which the performance of the host system will degrade.

The value of $T_{actual}$ can be compared with the value of $T_{baseline}$. When $T_{actual}$ is less than or equal to $T_{baseline}$, embodiments disclosed herein can determine that enabling the APB feature in the facility will be successful. However, when $T_{actual}$ is greater than $T_{baseline}$, embodiments disclosed herein can determine that enabling the APB feature in the facility will not be successful.

In some embodiments, some or all of the above-identified input parameters can be mined from prior event transaction logs and AREA configuration data for existing host systems that do not have an APB feature enabled or for updating a host system with APB enabled controllers. However, when an input parameter cannot be mined, it is to be understood that such a parameter can be provided by a user.

In some embodiments, the host system or another system in communication with the host system can include a database device for storing at least some of the above-identified equations and the data related thereto, data related to the past and present APB performance and status of the host system as compared to a baseline performance, and real-time identified risks to end users when the host system capacity is exceeded. Indeed, when exceeding the host system capacity is identified and communicated in real-time, end users and stakeholders can take appropriate corrective measures to mitigate risk in a timely manner.

In some embodiments, some or all of the information stored in the database device can be displayed on a user interface device of the host system or another system in communication with the host system. For example, in some embodiments, such information can be displayed on a dashboard, for example, by a dashboard application, on the user interface device, thereby providing an at-a-glance view of key performance indicators relevant to the host system capacity.

Figure 2:
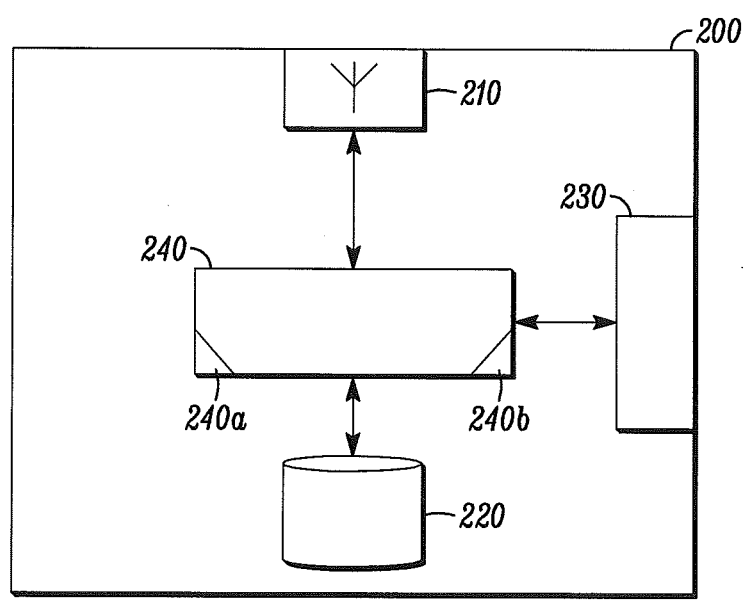
FIG. 2 is a block diagram of a host system in accordance with disclosed embodiments.

Some or all of the method 100 of FIG. 1 and the other methods described above and herein can be executed by a system 200 as seen in FIG. 2. For example, in some embodiments, the system 200 can include a host system or a system in communication with the host system.

As seen in FIG. 2, the system 200 can include a transceiver 210, a memory device 220, a user interface device 230, control circuitry 240, one or more programmable processors 240a, and executable control software 240b as would be understood by one of ordinary skill in the art. The executable control software 240b can be stored on a transitory or non-transitory computer readable medium, including, but not limited to local computer memory, RAM, optical storage media, magnetic storage media, and the like. In some embodiments, the control circuitry 240, the programmable processor 240a, and the executable control software 240b can execute and control some of the methods as described above and herein.

The memory device 220 can include a hard disk drive, RAM, or any other memory device as would be understood by one of ordinary skill in the art. Furthermore, the memory device 220 can include a database that can store the above-identified equations and the data related thereto, data related to the past and present APB performance and status of the host system as compared to a baseline performance, and identified real-time risks to end users when the host system capacity is exceeded.

When an APB feature is enabled for the first time on an access controller communicating with the transceiver 210 or when the memory device 220, the control circuitry 240, the programmable processor 240a, or the executable control software 240b is updated, the control circuitry 240, the programmable processor 240a, and the executable control software 240b can access the memory device 220 to identify the number of APB enabled access controllers supported by the system 200, to identify or set up the AREAs with IN and OUT readers for each controller, to identify, for each controller and reader, the type of reader in a respective AREA, the type of APB feature supported by the controller, and whether a host system should send an APB status message to the controller, to determine the number of APB status messages generated by the system 200, and responsive thereto and to a predetermined baseline number, to determine whether enabling the APB feature in the facility will be successful.

Although a few embodiments have been described in detail above, other modifications are possible. For example, the logic flows described above do not require the particular order described or sequential order to achieve desirable results. Other steps may be provided, or steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   a host system identifying a number of anti-pass back (APB) status messages generated by the host system in connection with the host system monitoring a facility;
   the host system comparing the number of APB status messages generated by the host system with a baseline threshold value;
   when the number of APB status messages generated by the host system is less than or equal to the baseline threshold value, the host system determining that enabling an APB feature in the facility will be successful; and when the number of APB status messages generated by the host system is greater than the baseline threshold value, the host system determining that enabling the APB feature in the facility will fail.

2. The method of claim 1 wherein the host system identifying the number of APB status messages generated by the host system includes:

the host system identifying a number of APB enabled access controllers in the facility and supported by the host system;

the host system identifying a number and a type of APB enabled card readers supported by the APB enabled access controllers;

the host system identifying a form of the APB feature used by each of the APB enabled card readers and each of the APB enabled access controllers;

the host system identifying a number of valid card transactions occurring at each of the APB enabled card readers within a predetermined period of time; and the host system identifying a type of access assigned to each access card that initiated each of the valid card transactions.

3. The method of claim 2 wherein the host system identifying the number of APB status messages generated by the host system includes, for the APB enabled access controllers identified as GLOBAL, the host system identifying the number of APB status messages generated for each GLOBAL access controller in accordance with the following equation:

the number of APB status messages generated=total number of valid card transactions occurring on the GLOBAL access controller*(total number of APB enabled controllers supported by the host system−1), wherein the access card that initiated each of the valid card transactions has access to all of the APB enabled access controllers.

4. The method of claim 2 wherein the host system identifying the number of APB status messages generated by the host system includes, for the APB enabled access controllers identified as SITE based, the host system identifying the number of APB status messages generated for each SITE based access controller in accordance with the following equation:

the number of APB status messages generated=Σ [total number of valid card transactions occurring on a card reader on the SITE based access controller in SITE(*i*)*(total number of unique APB enabled controllers between the SITE(*i*) and an AREA(*j*) referenced by the card reader−1)], wherein the access card that initiated each of the valid card transactions has access to all of the APB enabled access controllers.

5. The method of claim 2 wherein the host system identifying the number of APB status messages generated by the host system includes, for the APB enabled access controllers identified as AREA based, the host system identifying the number of APB status messages generated for each AREA based access controller in accordance with the following equation:

the number of APB status messages generated=[total number of valid card transactions occurring on a card reader on the AREA based access controller*(total number of APB enabled controllers in AREA(*j*) referenced by the card reader−1)], wherein the access card that initiated each of the valid card transactions has access to all of the APB enabled access controllers.

6. The method of claim 2 wherein the host system identifying the number of APB status messages generated by the host system includes, for the APB enabled access controllers identified as GLOBAL, the host system identifying the number of APB status messages generated for each GLOBAL access controller in accordance with the following equation:

the number of APB status messages generated=total number of valid card transactions occurring on the GLOBAL access controller*(total number of APB enabled controllers to which the access card initiating each of the valid card transactions has access−1), wherein the access card has limited access to the APB enabled access controllers.

7. The method of claim 2 wherein the host system identifying the number of APB status messages generated by the host system includes, for the APB enabled access controllers identified as SITE based, the host system identifying the number of APB status messages generated for each SITE based access controller in accordance with the following equation:

the number of APB status messages generated=Σ [total number of valid card transactions occurring on a card reader on the SITE based access controller in SITE(*i*)*(total number of unique APB enabled controllers between the SITE(*i*) and an AREA(*j*) referenced by the card reader and to which the access card initiating each of the valid card transactions has access−1)], wherein the access card has limited access to the APB enabled access controllers.

8. The method of claim 2 wherein the host system identifying the number of APB status messages generated by the host system includes, for the APB enabled access controllers identified as AREA based, the host system identifying the number of APB status messages generated for each AREA based access controller in accordance with the following equation:

the number of APB status messages generated=Σ [total number of valid card transactions occurring on a card reader on the AREA based access controller*(total number of APB enabled controllers in AREA(*j*) referenced by the card reader and to which the access card initiating each of the valid card transactions has access− 1)], wherein the access card has limited access to the APB enabled access controllers.

9. The method of claim 2 wherein the host system identifying the number of APB enabled access controllers in the facility and supported by the host system, the host system identifying the number and the type of APB enabled card readers supported by the APB enabled access controllers, the host system identifying the form of the APB feature used by each of the APB enabled card readers and each of the APB enabled access controllers, the host system identifying the number of valid card transactions occurring at each of the APB enabled card readers within the predetermined period of time, or the host system identifying the type of access assigned to each access card that initiated each of the valid card transactions includes the host system identifying at least some of the numbers, the types, and the form in a database device or in a prior event transaction log in the database device.

10. The method of claim 2 wherein the host system identifying the number of APB enabled access controllers in the facility and supported by the host system, the host system identifying the number and the type of APB enabled card readers supported by the APB enabled access controllers, the host system identifying the form of the APB feature used by each of the APB enabled card readers and each of the APB enabled access controllers, the host system identifying the number of valid card transactions occurring at each of the APB enabled card readers within the predetermined period of time, or the host system identifying the type of access assigned to each access card that initiated each of the valid card transactions includes the host system identifying at least some of the numbers, the types, and the form from user input.

11. The method of claim 1 further comprising displaying, on a user interface device, a representation of whether enabling the APB feature in the facility will be successful or will fail.

12. The method of claim 11 further comprising displaying the representation on a dashboard displayed on the user interface device, wherein the representation includes one or more key performance indicators relevant to a capacity of the host system.

13. A system comprising:
a transceiver;
a programmable processor; and
executable control software stored on a non-transitory computer readable medium,
wherein, when an anti-pass back (APB) feature is initially enabled on an access controller in communication with the transceiver or when the programmable processor and the executable control software are updated, the programmable processor and the executable control software identify a number of APB status messages generated thereby in connection with monitoring a facility,
wherein the programmable processor and the executable control software compare the number of APB status messages generated with a baseline threshold value,
wherein, when the number of APB status messages generated is less than or equal to the baseline threshold value, the programmable processor and the executable control software determine that enabling an APB feature in the facility will be successful, and
wherein, when the number of APB status messages generated is greater than the baseline threshold value, the programmable processor and the executable control software determine that enabling the APB feature in the facility will fail.

14. The system of claim 13 wherein the programmable processor and the executable control software identifying the number of APB status messages generated includes:
the programmable processor and the executable control software identifying a number of APB enabled access controllers in the facility and in communication with the transceiver,
the programmable processor and the executable control software identifying a number and type of APB enabled card readers supported by the APB enabled access controllers,
the programmable processor and the executable control software identifying a form of APB feature used by each of the APB enabled card readers and each of the APB enabled access controllers,
the programmable processor and the executable control software identifying a number of valid card transactions occurring at each of the APB enabled card readers within a predetermined period of time, and
the programmable processor and the executable control software identifying a type of access assigned to each access card that initiated each of the valid card transactions.

15. The system of claim 14 wherein the programmable processor and the executable control software identifying the number of APB status messages generated includes, for the APB enabled access controllers identified as GLOBAL, the programmable processor and the control software identifying the number of APB status messages generated for each GLOBAL access controller in accordance with the following equation:

the number of APB status messages generated=total number of valid card transactions occurring on the GLOBAL access controller*(total number of APB enabled controllers to which the access card initiating each of the valid card transactions has access−1).

16. The system of claim 14 wherein the programmable processor and the executable control software identifying the number of APB status messages generated includes, for the APB enabled access controllers identified as SITE based, the programmable processor and the control software identifying the number of APB status messages generated for each SITE based access controller in accordance with the following equation:

the number of APB status messages generated=Σ [total number of valid card transactions occurring on a card reader on the SITE based access controller in SITE(i)*(total number of unique APB enabled controllers between the SITE(i) and an AREA(j) referenced by the card reader and to which the access card initiating each of the valid card transactions has access−1)].

17. The system of claim 14 wherein the programmable processor and the executable control software identifying the number of APB status messages generated includes, for the APB enabled access controllers identified as AREA based, the programmable processor and the control software identifying the number of APB status messages generated for each AREA based access controller in accordance with the following equation:

the number of APB status messages generated=Σ [total number of valid card transactions occurring on a card reader on the AREA based access controller*(total number of APB enabled controllers in AREA(j) referenced by the card reader and to which the access card initiating each of the valid card transactions has access− 1)].

18. The system of claim 14 further comprising:
a database device,
wherein the programmable processor and the executable control software identifying the number of APB enabled access controllers in the facility and in communication with the transceiver, the programmable processor and the executable control software identifying the number and the type of APB enabled card readers supported by the APB enabled access controllers, the programmable processor and the executable control software identifying the form of the APB feature used by each of the APB enabled card readers and each of the APB enabled access controllers, the programmable processor and the executable control software identifying the number of valid card transactions occurring at each of the APB enabled card readers within the predetermined period of time, or the programmable processor and the executable control software identifying the type of access assigned to each access card that initiated each of the valid card transactions includes the programmable processor and the executable control software identifying at least some of the numbers, the types, and the form in the database device or in a prior event transaction log in the database device.

19. The system of claim 14 further comprising:

a user interface device, wherein the programmable processor and the executable control software identifying the number of APB enabled access controllers in the facility and in communication with the transceiver, the programmable processor and the executable control software identifying the number and the type of APB enabled card readers supported by the APB enabled access controllers, the programmable processor and the executable control software identifying the form of the APB feature used by each of the APB enabled card readers and each of the APB enabled access controllers, the programmable processor and the executable control software identifying the number of valid card transactions occurring at each of the APB enabled card readers within the predetermined period of time, or the programmable processor and the executable control software identifying the type of access assigned to each access card that initiated each of the valid card transactions includes the programmable processor and the executable control software identifying at least some of the numbers, the types, and the form from user input received via the user interface device.

20. The system of claim 13 further comprising:

a user interface device, wherein the programmable processor and the executable control software cause a representation of whether enabling the APB feature in the facility will be successful or will fail to be displayed on the user interface device.

* * * * *